No. 894,683. PATENTED JULY 28, 1908.
W. A. McCORMACK.
BOX SQUARE.
APPLICATION FILED MAR. 2, 1907.
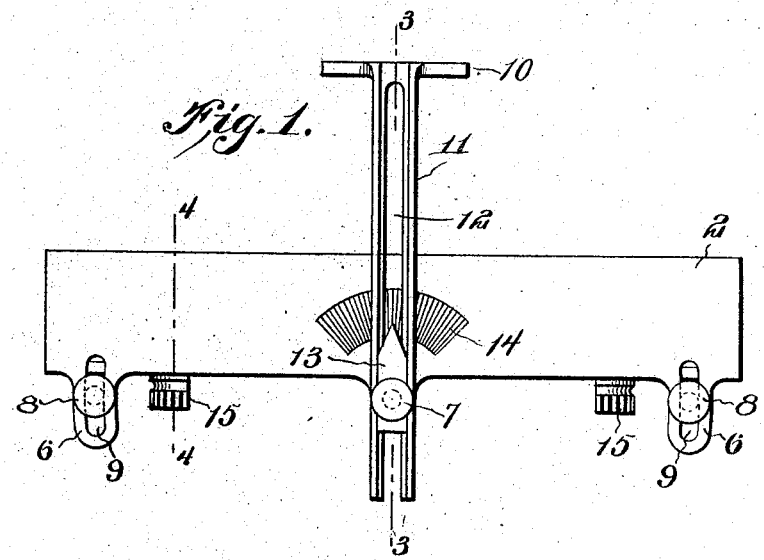
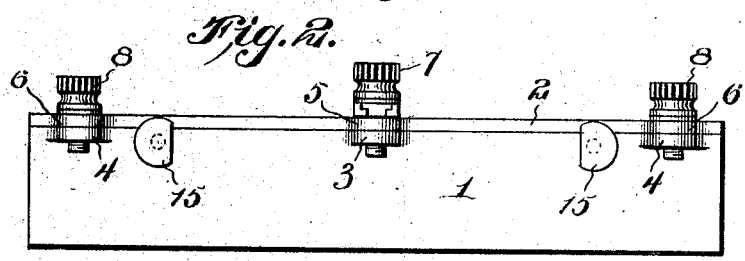
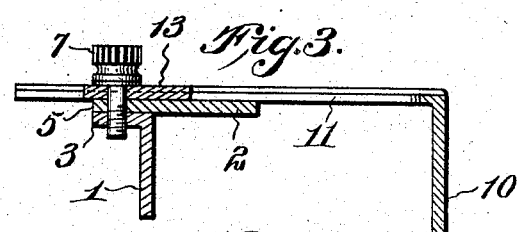
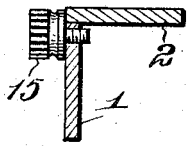
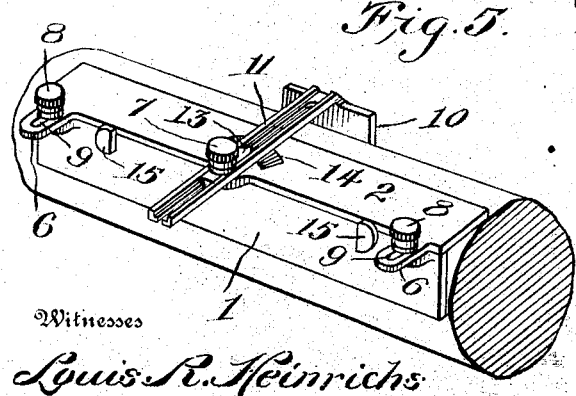
Inventor
William A. McCormack
Witnesses
Louis R. Heinrichs
C. C. Hines
By Victor J. Evans
Attorney

UNITED STATES PATENT OFFICE.

WILLIAM A. McCORMACK, OF BLOOMINGTON, ILLINOIS.

BOX-SQUARE.

No. 894,683.  Specification of Letters Patent.  Patented July 28, 1908.

Application filed March 2, 1907. Serial No. 360,255.

*To all whom it may concern:*

Be it known that I, WILLIAM A. MCCORMACK, a citizen of the United States, residing at Bloomington, in the county of McLean and State of Illinois, have invented new and useful Improvements in Box-Squares, of which the following is a specification.

This invention relates to squares, and particularly to "box" squares designed for straight or tapered shaft key-seating, centering and other analogous uses, the object of the invention being to provide a square of this character which is simple of construction, efficient in use and comparatively inexpensive of production, and adapted to be conveniently manipulated.

In the accompanying drawing,—Figure 1 is a side elevation of a box square embodying my invention. Fig. 2 is a bottom plan view of the same. Figs. 3 and 4 are transverse sections taken respectively on the line 3—3 and the line 4—4 of Fig. 1. Fig. 5 is a view showing the device as applied for use upon a straight shaft for indicating and marking off a line parallel with the axis of the shaft for key-seating the shaft, etc.

Referring to the drawings, the numeral 1 indicates a relatively stationary bottom blade arranged at right angles with respect to a coöperating side blade 2. The blade 1 is provided at its outer longitudinal edge with a central lug or ear 3 and end lugs or ears 4, disposed at right angles thereto, while the blade 2 is formed with coöperating lugs 5 and 6, the lugs 3 and 5 having screw threaded openings for the reception of a pivot and clamping screw 7, on which the plate 2 is adapted to swing or tilt. The lugs 4 have screw-threaded apertures for the reception of thumb screws 8 which pass through slots 9 in the lugs 6, said slots 9 being curved on arcs of a circle whose radius is struck from the screw 7 as a center. By means of the screws 8 the plate 2 may be locked against a tilting movement.

A sliding gage or upper blade 10 is disposed for coaction with the blade 1, said blades being adapted to bear against the opposite sides of the straight or tapered shaft to dispose the device in position thereon. The blade 10 is carried by an arm 11 arranged at right angles thereto and provided with a longitudinal slot 12 opening through the outer or lower end thereof, the outer surface of the arm being formed with a recess communicating with the slot and receiving an indicator 13 secured by the screw 7 against relative movement therein. The upper end of the indicator is tapered to form a pointer to coöperate with the scale 14 on the blade 2 for measuring the angle of inclination of said blade, the center or zero mark of the scale being in line with the point of the indicator 13 when the blades are arranged in normal position or at right angles to each other with the graduations extending in opposite directions from the zero point on a suitable arc, as shown. For the purpose of maintaining the blades 1 and 2 in exact angular relation and the blades 1 and 10 in parallelism or the blades 2 and 10 at determinate angles within their range of adjustment with respect to blade 1 screws 15 are mounted on the blade 1 to serve as turn buttons to engage the lower edge of the blade 2. The heads of these screws are cut away at one side to form a flattened surface, so that when the screws are turned to one position, the flattened faces will register with the edge of the blade 1, and the blade 2 will be permitted to clear the same in its pivotal movements.

The device may be employed as shown in Fig. 5 as a box square for determining the longitudinal central line of a straight shaft or marking off the shaft for key seating. In this operation it will be observed that the blade 1 is arranged to rest against one side of the shaft, the blade 10 against the other side of the shaft, and the blade 2 against the shaft in position at right angles to said blades 1 and 10, whereby a line on the surface of the shaft parallel with the axis of the shaft between the opposite surfaces engaged by the blades 1 and 2 will be determined, the blade 2 constituting, as will be understood, a ruler with its upper edge forming a scribing line. If desired the blade 10 may be entirely removed to prevent interference in the operation of marking off or scribing a central line parallel with the axis of the shaft. For angular work the blade 2 may be adjusted on the pivot screw 7. In key seating tapered shafts, the blade 10 is left free by loosening the screws 7 and 8, so that it may be adjusted with relation to the blade 1 to set said blades at the proper angle to conform to the taper of the shaft. In thus pivotally adjusting the blade 10 the pointer will be moved over the scale 14 in one direction or the other, thus indicating the taper of the shaft in degrees, and then by adjusting the blade 2 to a position to reduce by one half the taper degrees as indicated by the index finger a dividing line coinciding with the exact center line or axis of the shaft along the edge of the blade 2 will be secured.

Having thus described the invention, what is claimed as new is:—

1. A device of the class described comprising two blades arranged at right angles to each other, a clamping screw forming a central pivotal connection for the blades, means arranged on opposite sides of said screw for holding the blades at different positions of angular adjustment, and a third blade disposed in parallel relation to one of the first named blades and having a sliding engagement with the screw.

2. A device of the character described comprising a bottom blade, a side blade centrally pivoted to the bottom blade, clamping means adjustably connecting the ends of said blades, indicating means for indicating the degree of adjustment of the one blade with respect to the other, and a third blade arranged in parallel relation to one of the first named blades and slidably adjustable from and toward the same.

3. A device of the character described comprising a bottom blade, a side blade disposed at right angles thereto, a sliding gage associated with the side blade, a clamping screw pivotally connecting said blades between the ends thereof, means on opposite sides of said screw for securing the blades at different angles of adjustment, a pointer held by the pivotal screw to coöperate with the scale on the side blade, and an upper blade in parallel relation to the bottom blade having a slotted arm slidably engaging the pointer.

In testimony whereof, I affix my signature in presence of two witnesses.

WILLIAM A. McCORMACK.

Witnesses:
GEO. F. JORDAN,
M. J. MARTIN.